United States Patent

Yasuda et al.

[11] Patent Number: 6,055,271
[45] Date of Patent: Apr. 25, 2000

[54] SIGNAL ENCODING METHOD AND APPARATUS AND SIGNAL TRANSMISSION METHOD AND APPARATUS INVOLVING THE USE OF A NUMBER OF PSEUDO ACCESS UNITS

[75] Inventors: Mikita Yasuda, Tokyo; Katsumi Tahara, Kanagawa; Noriaki Oishi, Kanagawa; Shinji Negishi, Kanagawa, all of Japan

[73] Assignee: Sony Corporation, Tokyo, Japan

[21] Appl. No.: 08/786,086

[22] Filed: Jan. 17, 1997

[30] Foreign Application Priority Data

Jan. 18, 1996 [JP] Japan ................................. 8-006364

[51] Int. Cl.⁷ .................................................... H04N 7/16
[52] U.S. Cl. .................... 375/240; 348/390; 348/385; 348/386; 348/402; 348/398; 348/419; 348/423; 348/845.1; 348/845.2; 348/845.3
[58] Field of Search ................................. 348/390, 384, 348/423, 424, 461, 462, 463, 464, 465, 845.1, 845.2, 845.3, 10, 9; 386/109, 112, 119; 375/240

[56] References Cited

U.S. PATENT DOCUMENTS

| | | | |
|---|---|---|---|
| 5,481,543 | 1/1996 | Veltman | 348/423 |
| 5,521,927 | 5/1996 | Kim et al. | 348/423 |
| 5,534,944 | 7/1996 | Egawa et al. | 348/584 |
| 5,621,840 | 4/1997 | Kawamura et al. | 386/111 |
| 5,650,825 | 7/1997 | Naimpally et al. | 348/465 |
| 5,663,962 | 9/1997 | Caire et al. | 348/419 |
| 5,668,601 | 9/1997 | Okada et al. | 348/423 |
| 5,668,841 | 9/1997 | Haskell et al. | 348/500 |
| 5,677,980 | 10/1997 | Naoe et al. | 386/109 |
| 5,684,804 | 11/1997 | Baronetti et al. | 348/423 |
| 5,838,874 | 11/1998 | Ng et al. | 386/96 |

*Primary Examiner*—Andy Rao
*Attorney, Agent, or Firm*—Frommer, Lawrence & Haug, LLP.; William S. Frommer; Dennis M. Smid

[57] ABSTRACT

A method and apparatus for encoding a digital signal in the form of a stream, which will be decoded later via a predetermined number of buffers, in which the digital signal is encoded by dividing each access unit defined for each bit stream into pseudo access units each having a predetermined size, calculating the time when the inputting of each pseudo access unit to the buffer is completed on the basis of the decoding time of the access unit and the data transfer rate of the buffer, and converting the pseudo access units into a packet so that the pseudo access units will be input to the buffer by the time determined by the calculation. If each access unit for each bit stream has a small size and if the decoding interval between adjacent access units is short, a plurality of the access units are combined into a single pseudo access unit depending on the size of the buffer and the data transfer rate of the buffer. The invention also provides a method and apparatus for transmitting similarly obtained data. Furthermore, the invention provides a recording medium for recording similarly obtained data.

6 Claims, 11 Drawing Sheets

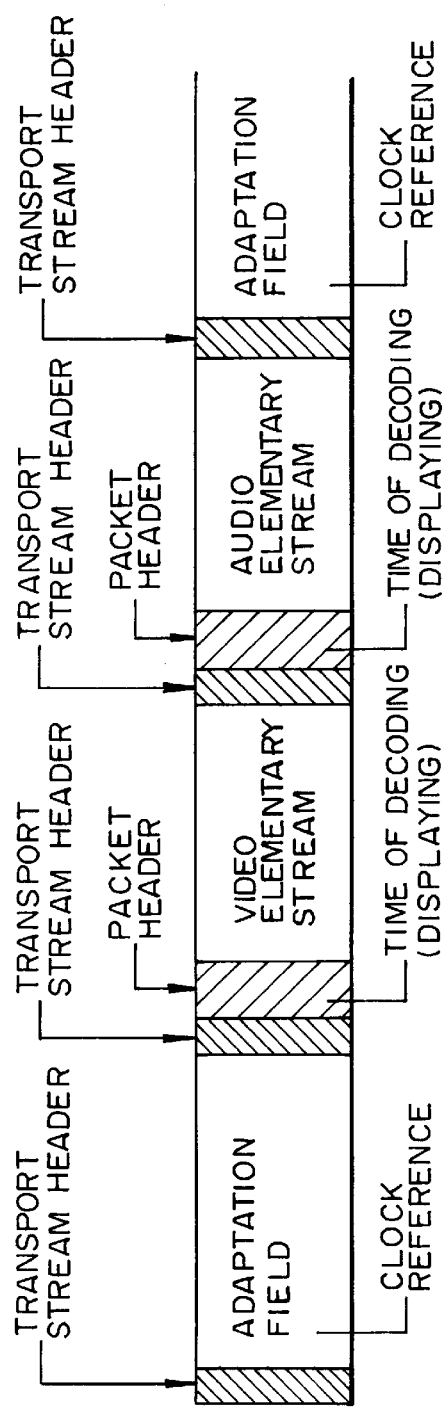
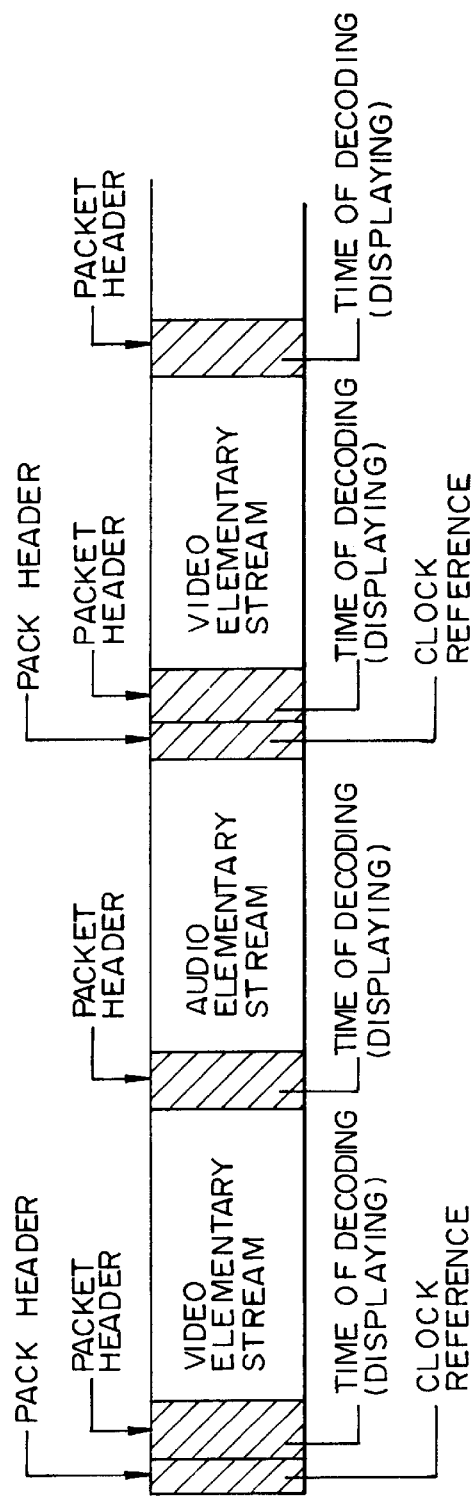
FIG.1A
FIG.1B

SIGNAL ENCODING METHOD AND APPARATUS AND SIGNAL TRANSMISSION METHOD AND APPARATUS INVOLVING THE USE OF A NUMBER OF PSEUDO ACCESS UNITS

BACKGROUND OF THE INVENTION

1. Field of the Invention

The present invention relates to a method and apparatus for encoding a digital signal, a method and apparatus for transmitting a digital signal, and a recording medium on which a stream encoded by means of the above method and/or apparatus for encoding a digital signal is recorded. More particularly, the present invention relates to a method and apparatus for encoding a digital signal into a form suitable for use in a system for recording a bit stream generated by combining a plurality of bit streams into packets, and to a method and apparatus for use in a system for transmitting a signal in such the form via a transmission line. The present invention also relates to a recording medium for recording a signal in such the form.

2. Description of the Related Art

In recent years, the MPEG (Moving Picture Experts Group) standard has become very popular. After converting an analog signal into a digital form, the resultant signal is encoded according to the MPEG standard, and recorded on a recording medium such as an magneto optic disk or a magnetic tape. The information recorded on the recording medium is reproduced and displayed on a display device in a video telephone system, broadcasting system, and the like. In these applications, the signals are encoded according to the MPEG standard and then transmitted via a proper transmission line, and a receiving device decodes the received signal for its usage. The MPEG standard refers to the standard which has been discussed in ISO-IEC/JTC1/SC2/WG11 and proposed as the standard defining the encoding/decoding method. This standard is a hybrid of an encoding method based on the expectation of motion and an encoding based on the discrete cosine transform. The technique is disclosed for example in the description and the drawings in U.S. Pat. No. 5,155,593 invented by the inventor of the present invention (date of patent: Oct. 13, 1992).

In the multimedia technology, different types of data such as a video signal, an audio signal, and related data are combined together and transmitted in a multiplexed fashion. At a receiving end, the received data is separated into individual data such as the video signal and the audio signal, and then these separated data are reproduced while maintaining the synchronization with each other.

When a plurality of data are combined together or multiplexed, a predetermined number of video and audio signals are first encoded separately thereby generating encoded streams for the respective signals, and then these streams are combined together.

After combining the plurality of data together, the resultant stream (multiplexed stream) is converted into the form of packet for each access unit such as a video elementary stream and an audio elementary stream, as shown in FIG. 1. Each packet contains information (clock reference) indicating when the packet should be input to a decoder and also contains information indicating when the access unit should be decoded (displayed). The "access unit" refers to an unit of decoded information. For example, in the case of a video signal, an access unit corresponds to a frame of data. In the case of an audio signal, an access unit corresponds to an audio frame.

If the time of decoding is incorporated into the respective encoded video and audio signals in the above-described manner, it becomes possible to achieve synchronization between the video and audio signals in the final output.

Streams used in MPEG systems will be described below. The streams used in the MPEG systems can be grouped into two types: transport streams and program streams. The transport stream is used for transmission in an environment where an error such as a bit error or cell loss can occur. More particularly, this type of stream is used in transmission for example over an ATM network or a communication line for digital broadcasting. On the other hand, the program stream is used to record information in an environment where an error is unlikely to occur. In particular, this type of stream is used to record information on a recording medium such as a magnetic disk or a magnetic tape.

Each stream will now be described in detail below with reference to FIG. 1.

A transport stream is composed of, as shown in FIG. 1A, various areas including adaptation fields, video elementary streams, and audio elementary streams, wherein each area has its own transport stream header. The video elementary streams and the audio elementary streams each have their own packet header. The clock reference described above is encoded in adaptation fields, and the time of decoding is encoded in packet headers.

As shown in FIG. 1B, a program stream is composed of areas including video elementary streams and audio elementary stream each having their own packet header. The program stream also includes pack headers. In this case, the clock reference is encoded in pack headers, and time of decoding is encoded in the packet headers.

When these elements are combined together into a transport stream or a program stream, it is assumed that the encoding be performed so that the resultant stream can be correctly decoded by a standard decoder (system target decoder (STD).

Referring now to FIG. 2, a typical digital signal encoder will be described below. When an elementary stream is input to the encoder shown in FIG. 2, the elementary stream is supplied to an access unit detector 41 and a packetizer 43. The access unit detector 41 extracts an access unit from the elementary stream and detects the size of the access unit and also detects the information representing the time of decoding. The access unit detector 42 supplies the detected information about the size of the access unit to a scheduler 42, and supplies the detected information about the time of decoding to both the scheduler 42 and the packetizer 43.

The scheduler 42 calculates the clock reference and the size of a packet on the basis of the information about the size of the access unit and the time of decoding. The resultant values are applied to the packetizer 43. The packetizer 43 converts the received elementary stream into the form of packets. The packetizer 43 also encodes the decoding time information supplied from the access unit detector 41 and the clock reference supplied from the scheduler. These data are combined into a MPEG system stream (a transport stream or a program stream) such as that shown in FIG. 1.

In the case where the output system stream from this packetizer 43 is a transport stream, the system stream is transmitted to a decoder such as that shown in FIG. 3 via a predetermined transmission channel 44. On the other hand, if the output system stream from this packetizer 43 is a program stream, it is recorded on a predetermined recording medium 45. The stream recorded on the recording medium can be reproduced from the recording medium and applied to a decoder such as that shown in FIG. 4.

The system target decoder (STD) will now be described below.

According to the MPEG-2 standard, the standard decoder for decoding a transport stream has a structure such as that shown in FIG. 3.

In the standard decoder for decoding a transport stream, shown in FIG. 3, an input stream is stored in a buffer once and then decoded at the specified time.

That is, in the standard decoder having buffers, clock reference is first detected from each access unit to be decoded, and data is input to the STD at the specified time.

The input data is separated by a switch 81 into different types of streams such as a video elementary stream, audio elementary stream, and the like, which are in turn supplied to a first-stage buffer 82.

The first-stage buffer 82 includes a video transport buffer and a plurality (N channels) of audio transport buffers. The access unit associated with the video elementary stream is supplied to the video transport buffer. The access unit associated with the audio elementary stream is supplied to a corresponding audio transport buffer.

The first-stage buffer 82 transfers the received data to a second-stage buffer (main buffer) 83 at a predetermined rate.

The second-stage buffer 83 includes a video main buffer and audio main buffers corresponding to the video transport buffer and the audio transport buffers in the first-stage buffer 82. The data transferred to the second-stage buffer 83 is stored in a corresponding main buffer of these. The second-stage buffer 83 detects the decoding time (time stamp) associated with the stored data, and transfers the data to a decoder 84 at the detected decoding time. The decoder 84 decodes the received data and outputs the resultant data.

Since the data which has been separated into individual access units is stored in the STD buffer until the specified time, it is required that the data should be multiplexed and encoded so that neither overflowing nor underflowing occurs when it is decoded.

FIG. 4 illustrates a standard decoder for decoding a program stream generated according to the MPEG-2 standard or a system stream generated according to the MPEG-1 standard. In the case of video elementary streams according to the MPEG-2 or MPEG-1 standard or in the case of audio elementary streams according to the MPEG-2 or MPEG-1 standard, the data is decoded by a standard decoder including an one-stage buffer 101 as opposed to the transport streams. In the case where a private stream defined by a specific user is decoded using a decoder including two stages of buffers 103 and 104, it is required that the data should be encoded so that the resultant encoded data can be decoded by the decoder with the two-stage buffer as in the transport streams.

To prevent the overflowing and underflowing in either the first-stage buffer or the second-stage buffer when a transport stream or a program stream is decoded, it is required that during the encoding operation the clock reference should be generated while monitoring the size of data occupying the two buffers. This results in extreme complexity in the algorithm of combining data together.

Furthermore, in either the one-stage buffer decoder or the two-stage buffer decoder, since the decoding time is defined for each access unit the number of operations of converting the data into packets increases with the reducing size of the access unit.

It is a general object of the present invention to solve the above problems. More specifically, it is an object of the present invention to provide a digital signal encoding method and apparatus, and a digital signal transmission method and apparatus, capable of dealing with signals with an extremely simplified algorithm. It is another object of the present invention to provide a recording medium for recording data in the form of a stream encoded using such the method and/or apparatus.

It is still another object of the present invention to provide a digital signal encoding method and apparatus, and a digital signal transmission method and apparatus, capable of easily encoding data without having to monitor the size of data occupying buffers over the whole stages. It is another object of the present invention to provide a recording medium for recording data in the form of a stream encoded using such the method and/or apparatus.

It is another object of the present invention to provide a digital signal encoding method and apparatus, and a digital signal transmission method and apparatus, capable of encoding data in a highly efficient fashion with a reduced number of operations of converting the data into packets. It is another object of the present invention to provide a recording medium for recording data in the form of a stream encoded using such the method and/or apparatus.

SUMMARY OF THE INVENTION

According to an aspect of the present invention, there is provided a method of encoding a digital signal in the form of a stream, which will be decoded later via a predetermined number of buffers, the method comprising the steps of: dividing each access unit defined for each bit stream into pseudo access units each having a predetermined size; calculating the time when the inputting of each pseudo access unit to the buffer is completed on the basis of the decoding time of the access unit and the rate at which the data is transferred to the buffer; and converting the pseudo access units into a packet so that the pseudo access units will be input to the buffer by the time determined by the above calculation.

According to another aspect of the present invention, there is provided an apparatus for encoding a digital signal in the form of a stream, which will be decoded later via a predetermined number of buffers, the apparatus comprising: dividing each access unit defined for each bit stream into pseudo access units each having a predetermined size; means for calculating the time when the inputting of each pseudo access unit to the buffer is completed on the basis of the decoding time of the access unit and the rate at which the data is transferred to the buffer; and means for converting the pseudo access units into a packet so that the pseudo access units will be input to the buffer by the time determined by the above calculation.

According to still another aspect of the invention, there is provide a method of transmitting a digital signal in the form of a stream, which will be decoded later via a predetermined number of buffers, the method comprising the steps of: dividing each access unit defined for each bit stream into pseudo access units each having a predetermined size; calculating the time when the inputting of each pseudo access unit to the buffer is completed on the basis of the decoding time of the access unit and the rate at which the data is transferred to the buffer; generating a transmission stream by converting the pseudo access units into a packet so that the pseudo access units will be input to the buffer by the time determined by the above calculation; and transmitting the transmission stream.

According to a further aspect of the present invention, there is provided an apparatus for transmitting a digital signal in the form of a stream, which will be decoded later via a predetermined number of buffers, the apparatus comprising: dividing each access unit defined for each bit stream into pseudo access units each having a predetermined size; means for calculating the time when the inputting of each pseudo access unit to the buffer is completed on the basis of the decoding time of the access unit and the rate at which the data is transferred to the buffer; and means for generating a transmission stream by converting the pseudo access units into a packet and then transmitting the transmission stream so that the pseudo access units will be input to the buffer by the time determined by the above calculation.

According to another aspect of the invention, there is provided a method of encoding a digital signal in the form of a stream, which will be decoded later via at least one or more buffers, the method comprising the steps of: if each access unit defined for each bit stream has a small size and if the decoding interval between adjacent access units is short, combining a plurality of the access units into a single pseudo access unit depending on the size of the buffer and the data transfer rate of the buffer; calculating the time when the inputting of the pseudo access unit to the buffer is completed; and converting the pseudo access units into a packet so that the pseudo access units will be input to the buffer by the time determined by the above calculation.

According to still another aspect of the preset invention, there is provided an apparatus for encoding a digital signal in the form of a stream, which will be decoded later via at least one or more buffers, the method comprising: means for, if each access unit defined for each bit stream has a small size and if the decoding interval between adjacent access units is short, combining a plurality of the access units into a single pseudo access unit depending on the size of the buffer and the data transfer rate of the buffer; means for calculating the time when the inputting of the pseudo access unit to the buffer is completed; and means for converting the pseudo access units into a packet so that the pseudo access units will be input to the buffer by the time determined by the above calculation.

According to another aspect of the present invention, there is provided a method of transmitting a digital signal in the form of a stream, which will be decoded later via at least one or more buffers, the method comprising the steps of: if each access unit defined for each bit stream has a small size and if the decoding interval between adjacent access units is short, combining a plurality of the access units into a single pseudo access unit depending on the size of the buffer and the data transfer rate of the buffer; calculating the time when the inputting of the pseudo access unit to the buffer is completed; and generating a transmission stream by converting the pseudo access units into a packet so that the pseudo access units will be input to the buffer by the time determined by the above calculation; and transmitting the transmission stream.

According to another aspect of the present invention, there is provided an apparatus for transmitting a digital signal in the form of a stream, which will be decoded later via at least one or more buffers, the apparatus comprising: means for, if each access unit defined for each bit stream has a small size and if the decoding interval between adjacent access units is short, combining a plurality of the access units into a single pseudo access unit depending on the size of the buffer and the data transfer rate of the buffer; means for calculating the time when the inputting of the pseudo access unit to the buffer is completed; and means generating a transmission stream by converting the pseudo access units into a packet and then transmitting the transmission stream so that the pseudo access units will be input to the buffer by the time determined by the above calculation.

According to a further aspect of the present invention, there is provided a recording medium for recording a signal which can be decoded by a decoding apparatus with a predetermined number of buffers, the signal recorded on the recording medium including a coded bit stream which can be decoded via the predetermined number of buffers, the coded bit stream being generated by the process including the steps of: dividing an access unit defined for each the bit stream into pseudo access units each having a predetermined size; calculating the time when the inputting of each the pseudo access unit to the buffer is completed on the basis of the decoding time of the access unit and the rate at which the data is transferred to the buffer; and converting the pseudo access units into a packet and then outputting the resultant coded stream so that the pseudo access units will be input to the buffer by the time determined by the above calculation.

According to another aspect of the present invention, there is provided a recording medium for recording a signal which can be decoded by a decoding apparatus with at least one or more buffers, the signal recorded on the recording medium including a coded bit stream which can be decoded via the predetermined number of buffers, the coded bit stream being generated by the process including the steps of: if each access unit defined for each bit stream has a small size and if the decoding interval between adjacent access units is short, combining a plurality of the access units into a single pseudo access unit depending on the size of the buffer and the data transfer rate of the buffer; calculating the time when the inputting of the pseudo access unit to the buffer is completed; and converting the pseudo access units into a packet so that the pseudo access units will be input to the buffer by the time determined by the above calculation.

BRIEF DESCRIPTION OF THE DRAWINGS

FIG. 1 is a schematic representation of an example of the structure of a transport stream and that of a program stream;

DESCRIPTION OF THE PREFERRED EMBODIMENTS

Figure 2:
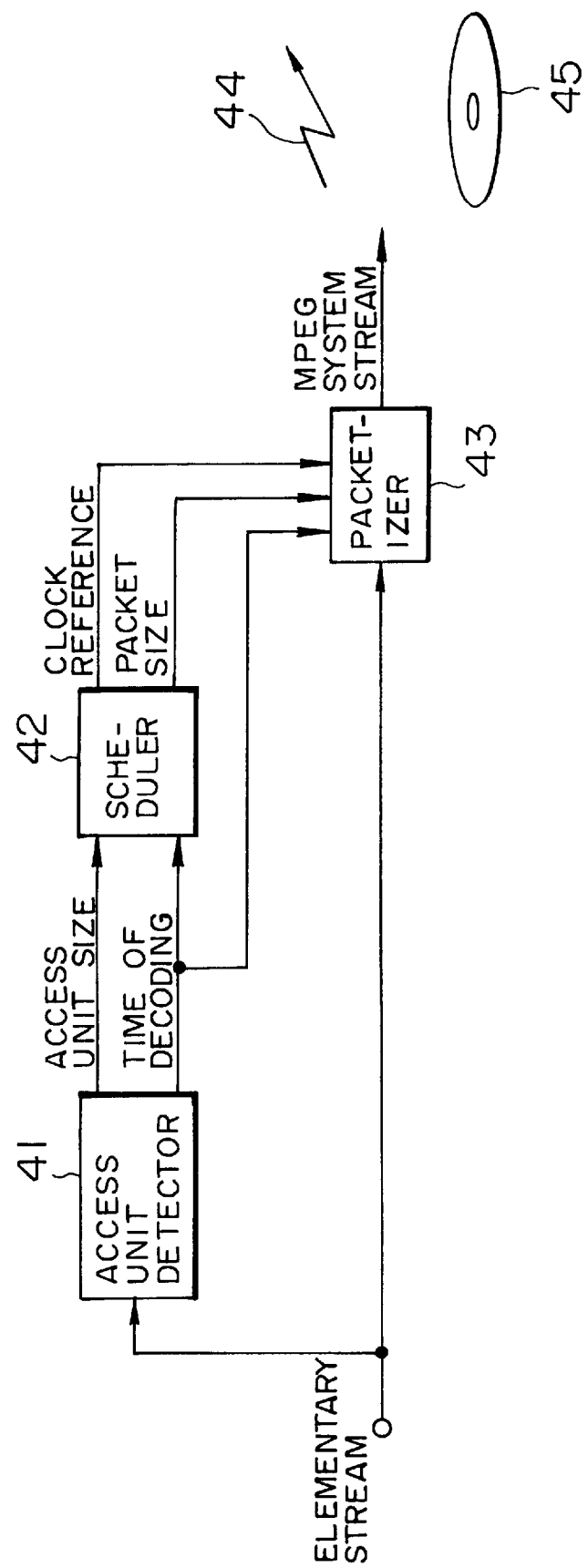
FIG. 2 is a block diagram illustrating an example of the construction of a digital signal encoder according to the present invention.
Figure 3:
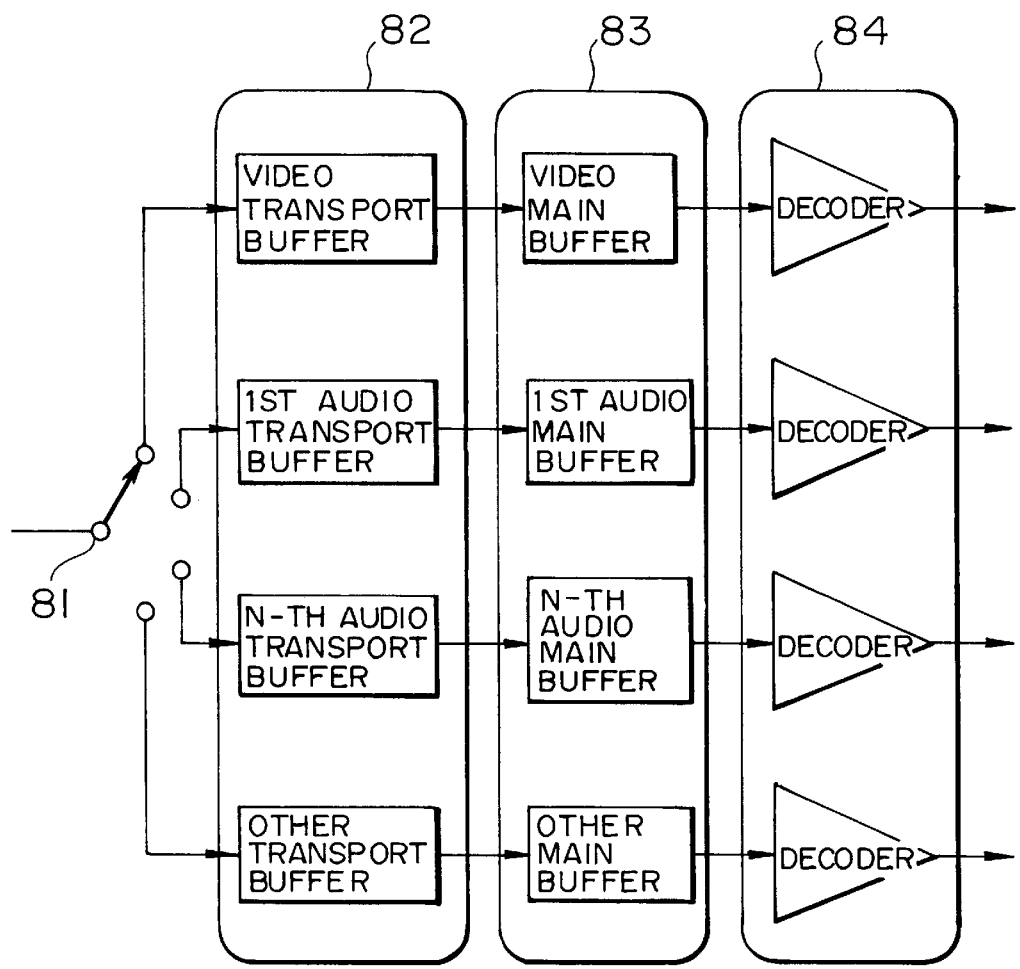
FIG. 3 is a block diagram illustrating an example of the construction of a standard transport stream decoder.
Figure 4:
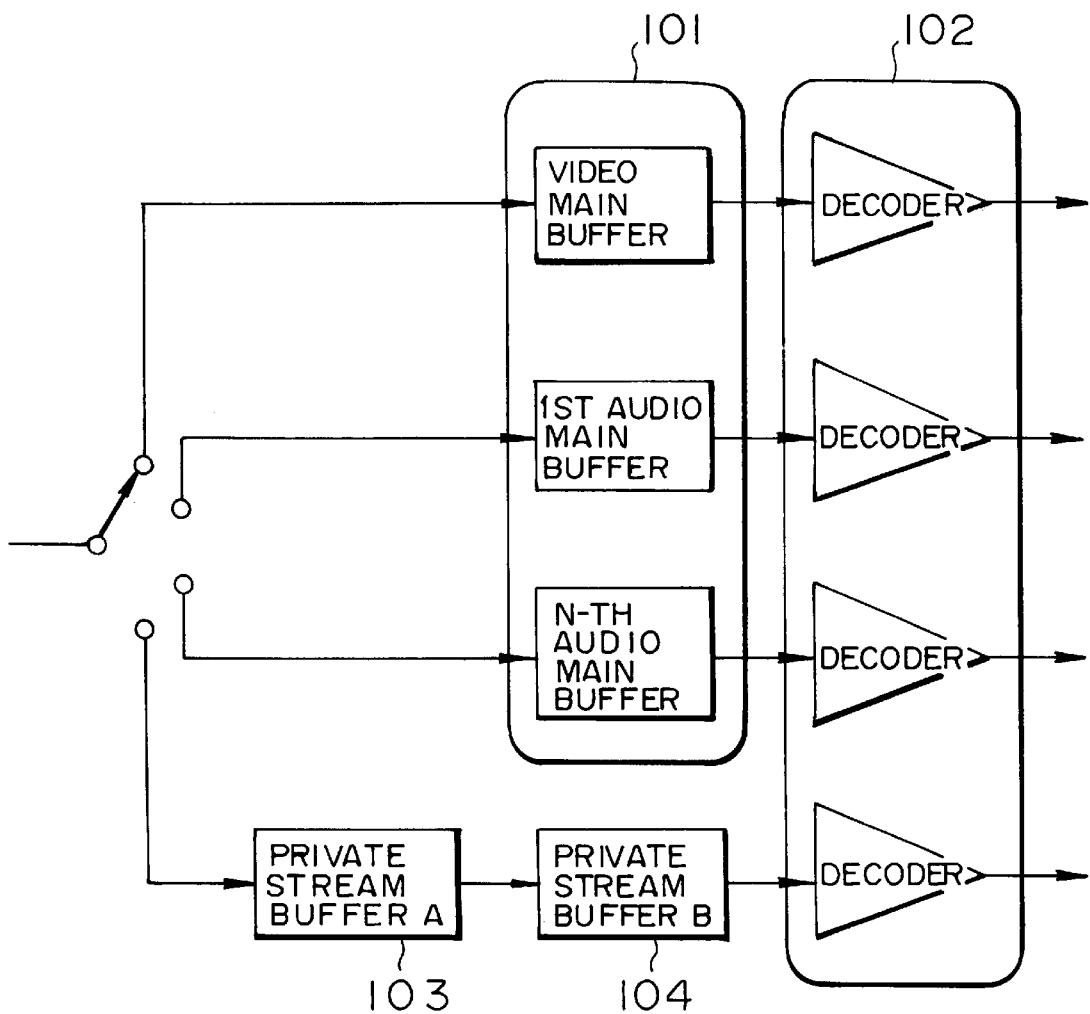
FIG. 4 is a block diagram illustrating an example of the construction of a standard program stream decoder.
Figure 5:
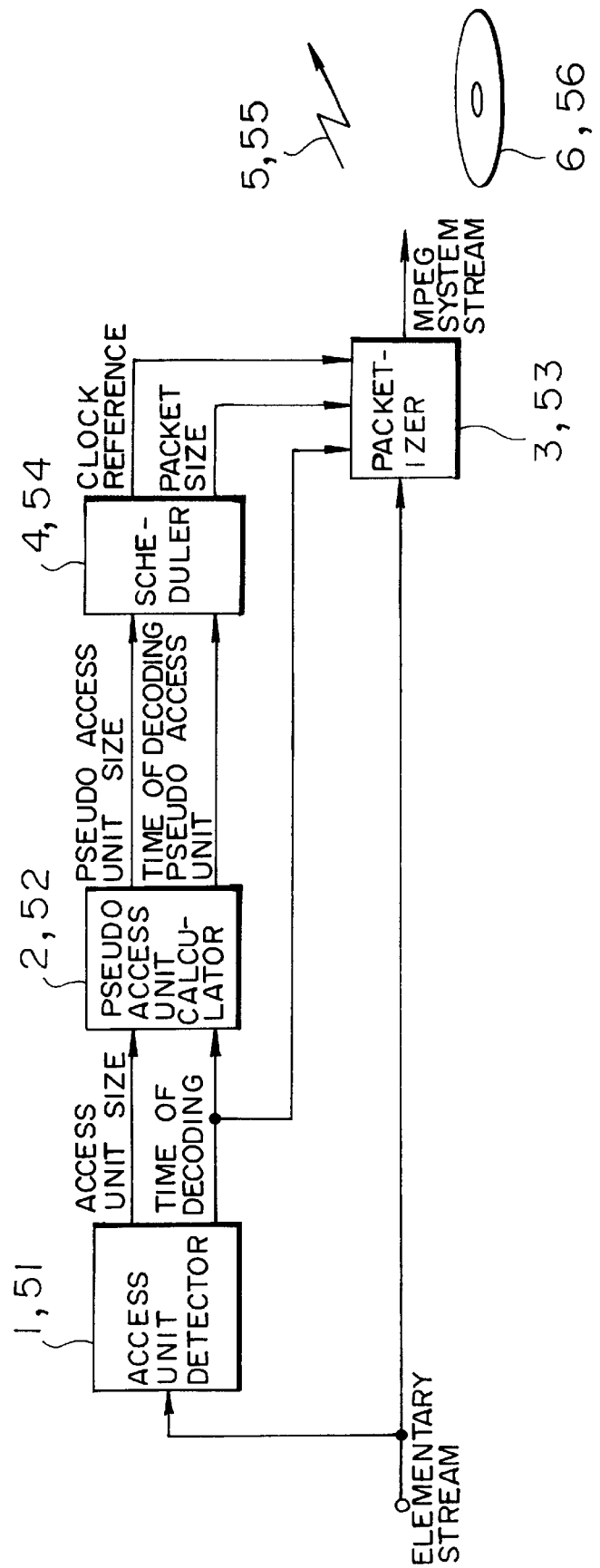
FIG. 5 is a block diagram illustrating an embodiment of a digital signal encoder according to the present invention.

FIG. 5 illustrates a first embodiment of a digital signal encoder according to the present invention. In this first embodiment, it is assumed that the data be encoded in the form which can be correctly decoded by a standard decoder with a two-stage buffer shown in FIG. 6. The digital signal encoder is adapted to convert an elementary stream into a MPEG system stream (a transport stream or a program stream) in the form of packets which can be decoded by the above standard decoder.

In this embodiment, an access unit detector 1 extracts an access unit from a given elementary stream, and detects the size of the access unit and the decoding time information. The "access unit" refers to an unit of decoded information. In the case of a video signal, the access unit corresponds to a frame of data. The access unit in an audio signal corresponding to an audio frame. The access unit detector 1 supplies the detected information about the size of the access unit to a pseudo access unit calculator 2, and supplies the detected information about the time of decoding to both the pseudo access unit calculator 2 and a packetizer 3.

The pseudo access unit calculator 2 generates pseudo access units by dividing the access unit depending on the size of a first-stage buffer 21 shown in FIG. 6, which will be described in detail later, the data transfer rate to the first-stage buffer 21, and the data transfer rate to a second-stage buffer 22. Furthermore, the pseudo access unit calculator 2 calculates the size of a pseudo access unit and the time (pseudo time) when the pseudo access unit is to be applied to the first-stage buffer 21, and supplies the resultant values to a scheduler 4.

According to the pseudo access unit size and the pseudo decoding time, the scheduler 4 determines the time (clock reference) when the multiplexed stream is to be supplied to the decoder and also determines the packet size. The resultant values are supplied to a packetizer 3.

The packetizer 3 converts the elementary stream into packets. The packetizer 3 also encodes the decoding time data supplied from the access unit detector 2 as well as the clock reference data supplied from the scheduler 4. These data are combined into a MPEG system stream (a transport stream or a program stream) such as that shown in FIG. 1.

Figure 6:
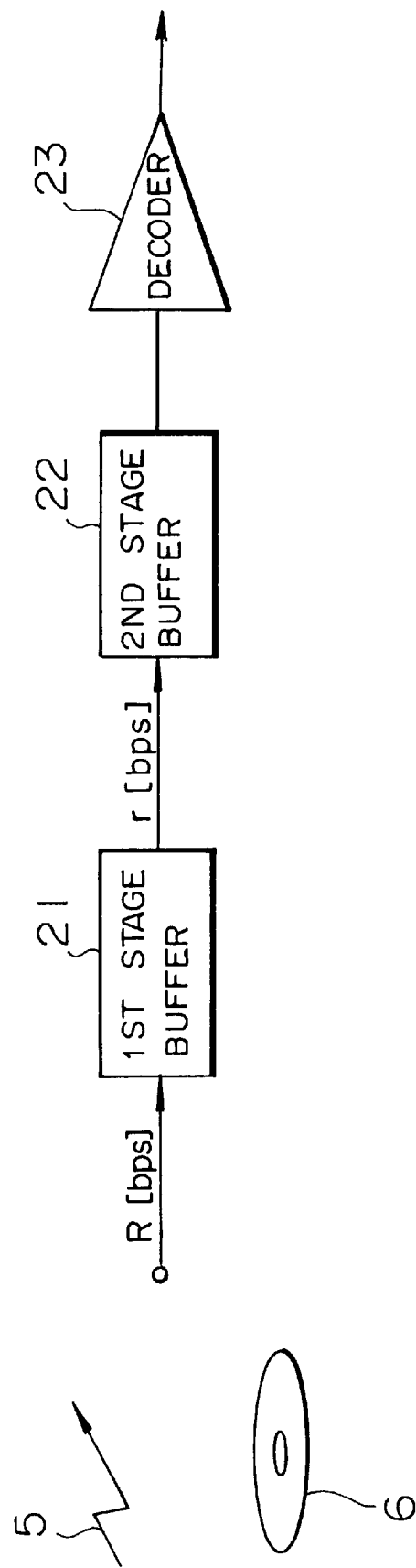
FIG. 6 is a block diagram illustrating an example of the structure of a standard decoder with a two-stage buffer.

In the case where the stream output from the packetizer 3 is a transport stream, the stream is transmitted via a proper transmission line 5 to a decoder such as that shown in FIG. 6. On the other hand, if the stream output from the packetizer 3 is a program stream, it is recorded on a proper recording medium 6. The stream recorded on the recording medium can be reproduced from the recording medium and applied to the decoder shown in FIG. 6.

In the standard decoder with a 2-stage buffer shown in FIG. 6, the system stream is supplied to a first-stage buffer 21 at a bit rate R [bps] (bits per second). The first-stage buffer 21 supplies data to a second-stage buffer 22 at a bit rate r [bps] (R>r).

The second-stage buffer 22 detects the decoding time from the data supplied from the first-stage buffer 21, and outputs the data to the decoder 23 at the time specified by the decoding time data.

The decoder 23 decodes the data supplied from the second-stage buffer 22, and outputs the decoded data to a specified device such as a display device.

Figure 7A:
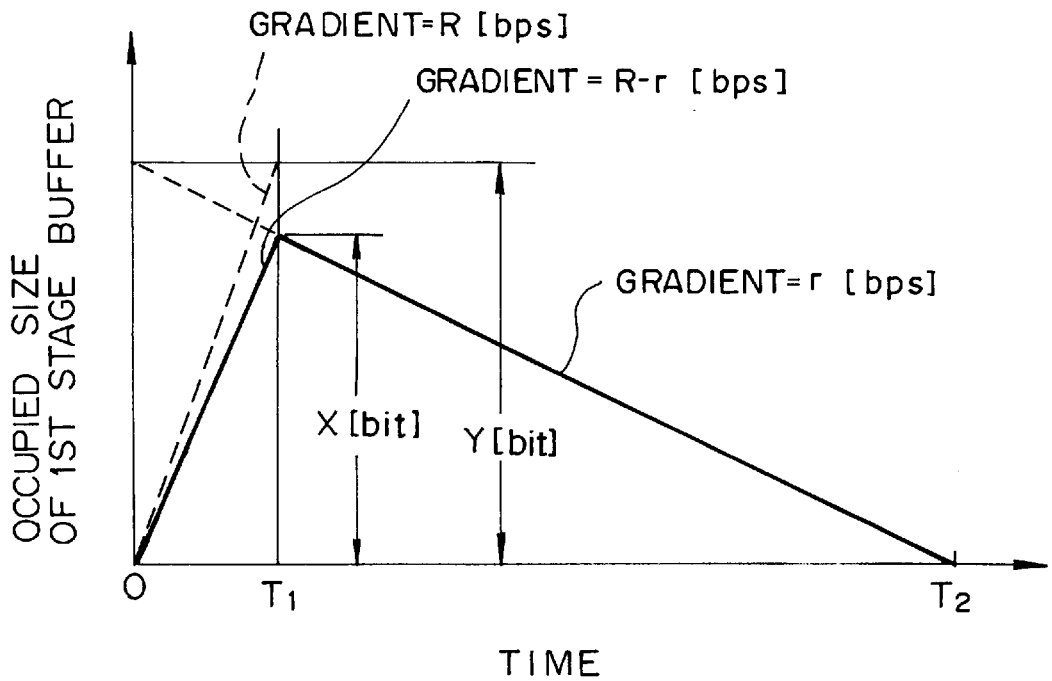
FIG. 7 illustrates an example of the change in size of data occupying the respective buffers in the standard decoder with the two stages of buffers shown in FIG. 6.
Figure 7B:
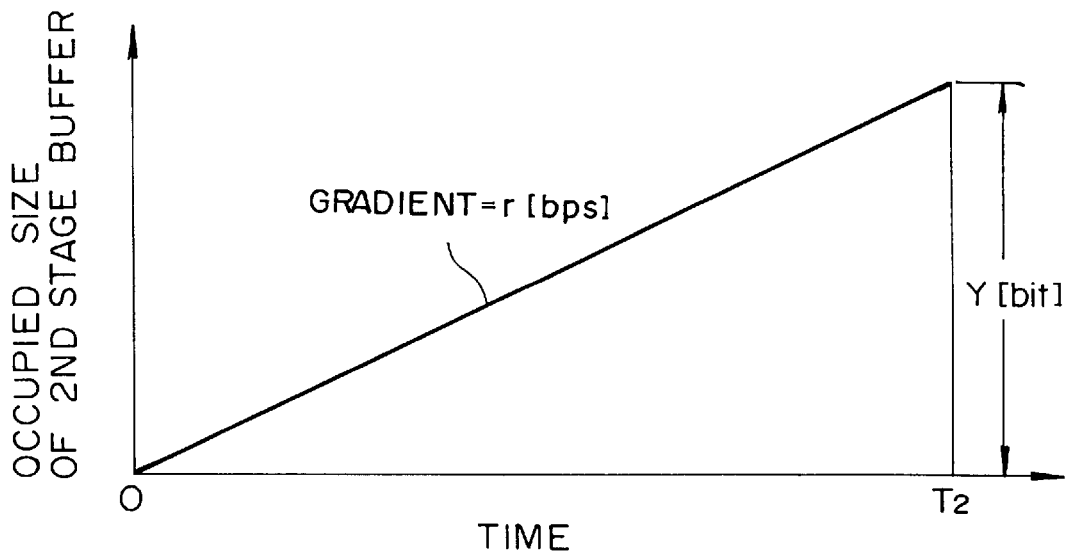

FIG. 7 illustrates the change in the size of data occupying the first-stage buffer 21 (FIG. 7A) and also the change in the size of data occupying the second-stage buffer 22 (FIG. 7B).

The first-stage buffer 21 starts receiving data at time 0, and transfers the data to the second-stage buffer 22 at a rate r [bps]. Therefore, the first-stage buffer 21 accumulates the data at a rate equal to R−r [bps] as long as the data is supplied to the first-stage buffer at a rate R [bps].

When Y-bit data is supplied to the first-stage buffer 21 at a bit rate R [bps], the first-stage buffer 21 starts to supplying the data to the second-stage buffer 22 at the bit rate r [bps] as soon as the supplying of the data to the first-stage buffer 21 has started. The data is supplied to the first-stage buffer 21 for T1 sec (T1=Y/R). Thus, the size of data occupying the first-stage buffer 21 reaches X=Y(1−r/R) at T1.

The supply of data to the first-stage buffer 21 stops at T1. However, the first-stage buffer 21 continues to supply the data to the second-stage buffer 22 (for a period of time ΔT) until all the data has been transferred from the first buffer 21 to the second-stage buffer at T2.

The second-stage buffer 22 accumulates data at a constant rate r for a period of time from 0 to T2, as shown in FIG. 7B. Since all the data (containing Y bits) has been transferred to the second-stage 22 at T2, T2=Y/r.

Thus, the period of time ΔT (T2−T1) from the start of the supplying of data to the first-stage buffer 21 to the completion of transferring all the data to the second-stage buffer 22 is equal to Y(1/r−1/R).

The operation of the pseudo access unit calculator 2 disposed in the encoder will be described below. The pseudo access unit calculator 2 in the encoder determines the size (Pseudo_AU_Size) of the pseudo access unit supplied to the first-stage buffer 21 as well as the time (Pseudo_PTS) at which the supplying of all the pseudo access unit will be completed so that a predetermined size (AU_Size) of data can be supplied to the second-stage buffer 22 of the standard decoder by time PTS thereby ensuring that the decoder can decode the data correctly. The procedure of calculating the size of the pseudo access unit and the time at which the input of the pseudo access unit is completed will be described below with reference to the flow chart of FIG. 8 and also to FIG. 9.

In the calculation of the size of the pseudo access unit and the time when the input of the pseudo access unit is completed, the pseudo access unit calculator 2 first calculates the upper limit (ΔAUS) of the size of the pseudo access unit which can be supplied to the first-stage buffer 21 without causing an overflow.

As described above, when data containing Y bits is supplied to the first-stage buffer 21, the maximum data size occupying the first-stage buffer 21 is equal to Y(1−r/R). Therefore, the upper limit ΔAUS is given by the data size Y when the maximum data size occupying the first-stage buffer 21 becomes equal to the size of the first-stage buffer 21. Since the maximum data size occupying the first-stage buffer is given by ΔAUS(1−r/R), ΔAUS must meet ΔAUS (1−r/R)<(the size of the buffer 21) so as to avoid the overflowing in the buffer 21.

Figure 8:
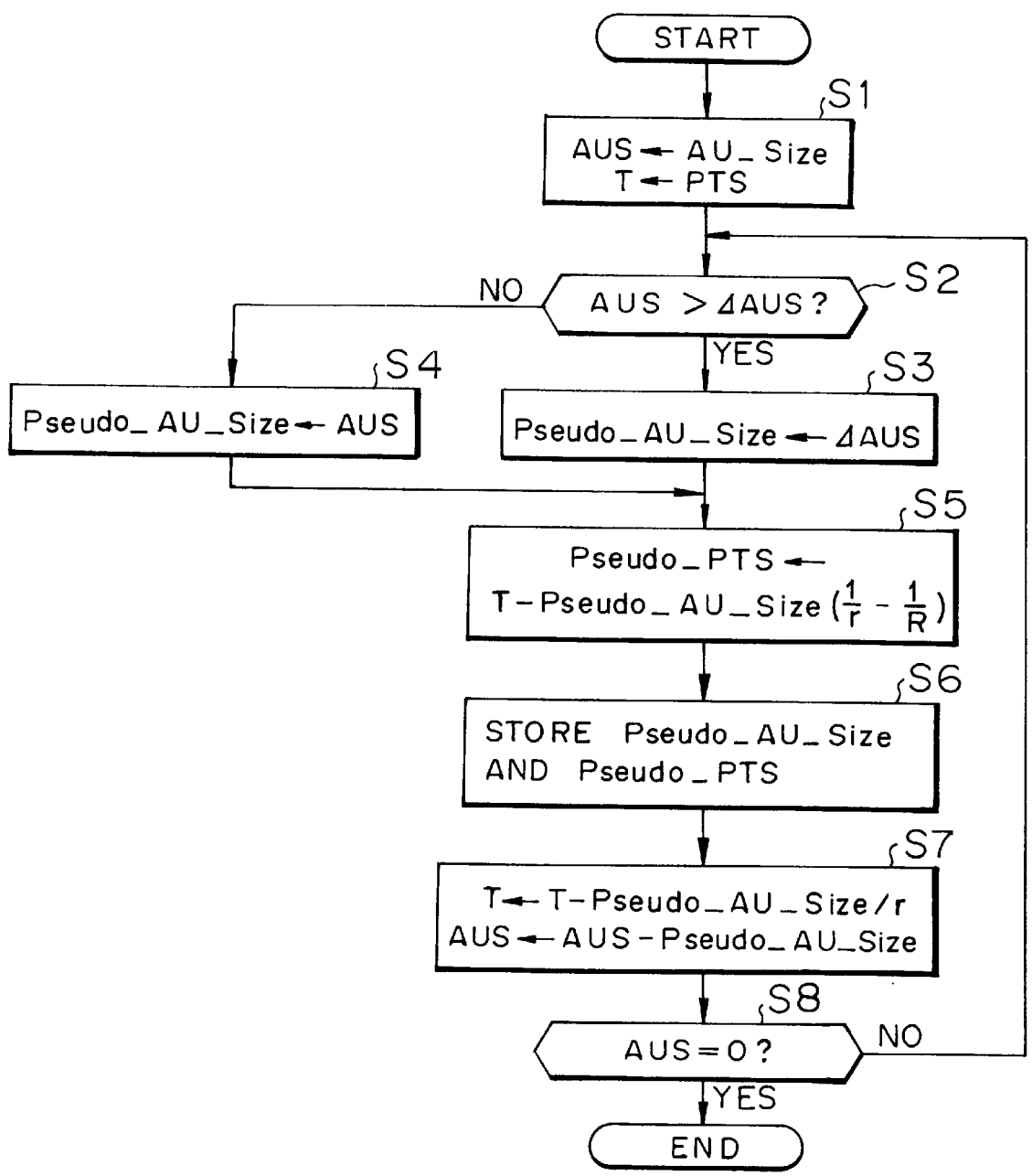
FIG. 8 is a flow chart illustrating the procedure of calculating the time when the data should be input to the first-stage buffer shown in FIG. 6.

Referring now to the flow chart shown in FIG. 8, the procedure of calculating Pseudo_PTS and Pseudo_AU_Size using the pseudo access unit calculator 2 will be described below. In this procedure, the time by which the supplying of all the data to the buffer 21 should be completed is determined by performing a calculation backward in time relative to the decoding time PTS.

At the first step S1 in the procedure, the size AU_Size of the access unit is substituted into the variable AUS, and the decoding time PTS is substituted into the variable T.

Then in step S2, it is determined whether the variable AUS is greater than the upper limit ΔAUS of the pseudo access unit.

If yes, then the process goes to step S3, and the ΔAUS is substituted into the size of the pseudo access unit Pseudo_AU_Size.

Then the process goes to step S5 so as to calculate the time Pseudo_PTS at which the inputting of the pseudo access unit will be completed.

Pseudo_PTS can be obtained by subtracting ΔT from T (Pseudo_PTS=T−ΔT) wherein the current value of the variable T is equal to the value of PTS and the ΔT represents the period of time from the start of transferring the data to the second-stage buffer 22 to the time when the first-stage buffer 21 becomes empty.

When all the data has been input to the first-stage buffer 21, the size of the data stored in the first-stage buffer 21 is equal to Pseudo_AU_Size·(1−r/R). Since this data is transferred to the second-stage buffer 22 at the rate r, ΔT=Pseudo_AU_Size(1/r−1/R)(=Pseudo_AU_Size(1−r/R)/r). Thus, Pseudo_PTS is given as:

Pseudo_PTS=T−Pseudo_AU_Size×(1/r−1/R)

Then in step S6, the value of Pseudo_AU_Size and calculated in step S3 and the value of Pseudo_PTS calculated in step S5 are stored.

In step S7, the variable T is updated by subtracting the time required to completely transfer the pseudo access unit with Pseudo_AU_Size to the second-stage buffer 22 from the variable T, and the variable AUS is updated by subtracting Pseudo_AU_Size from the variable AUS.

Figure 9:
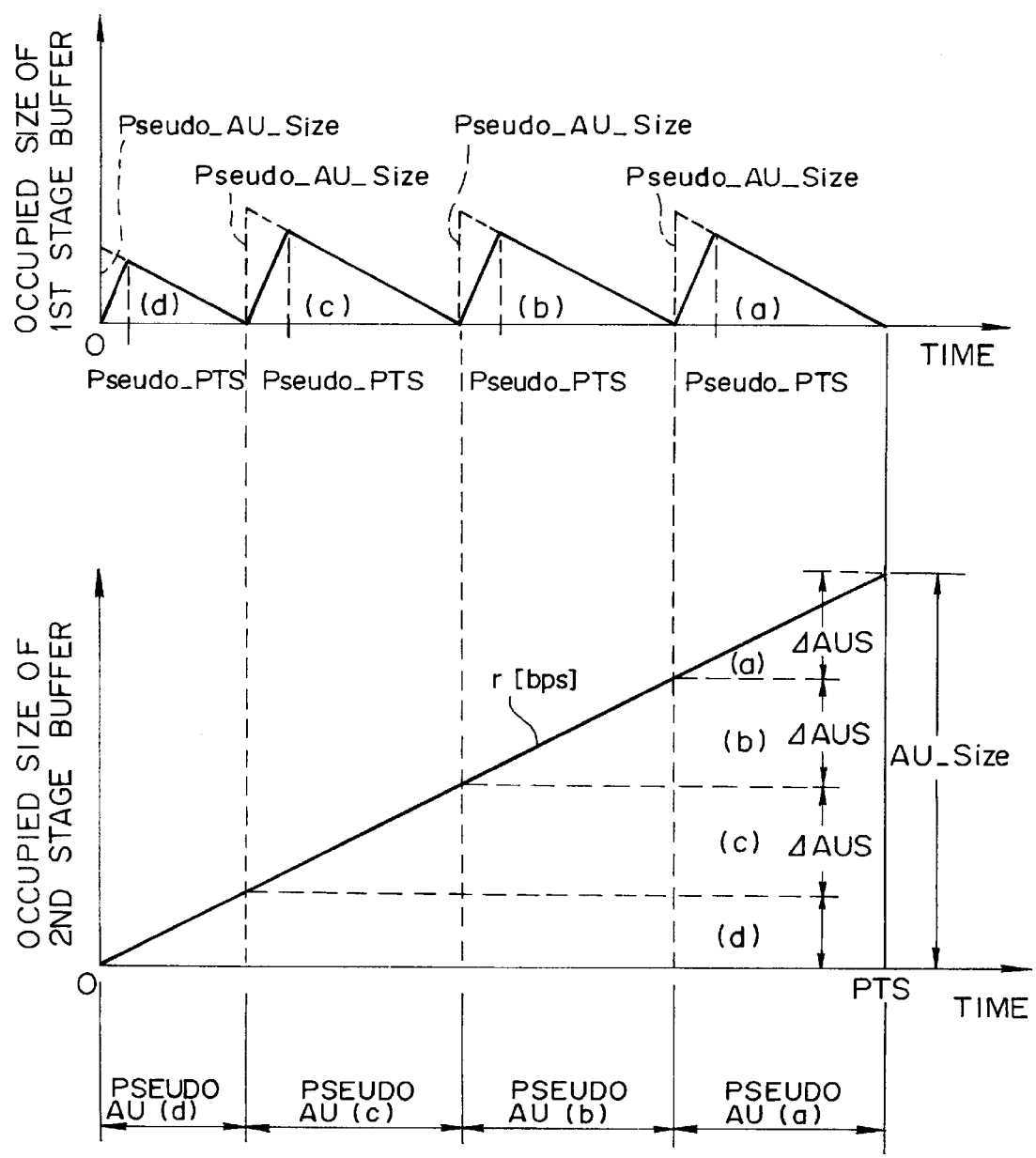
FIG. 9 illustrates an example of the change in size of data occupying the respective buffers in the standard decoder with the two stages of buffers shown in FIG. 6, wherein each access unit is divided into pseudo access units.

For example, when an access unit is divided into four pseudo access units as shown in FIG. 9, Pseudo_AU_Size and Pseudo_PTS are calculated first for a pseudo access unit (a).

Then in step S8, it is judged whether the variable AUS is equal to zero. If yes, the process of dividing the access unit into pseudo access units has been completed. In the case where the variable AUS is not equal to zero, the process returns to step S2 so as to calculate Pseudo_AU_Size and Pseudo_PTS for the next pseudo access unit.

In the specific example shown in FIG. 9 in which one access unit is divided into four pseudo access units, Pseudo_AU_Size and Pseudo_PTS for the pseudo access unit (b) are calculated by performing steps S2, S3 and steps S5 to S7. Pseudo_AU_Size and Pseudo_PTS for the pseudo access unit (c) are then calculated in a similar manner.

Finally, Pseudo_AU_Size and Pseudo_PTS for the pseudo access unit (d) shown in FIG. 9 are calculated. In this case, step S2 concludes that AUS is smaller than ΔAUS and thus the process goes to step S4 in which AUS is substituted into Pseudo_AU_Size.

After that, as in the calculation for the pseudo access units (a), (b) and (c), Pseudo_PTS for the pseudo access unit (d) is calculated in step S5. Then in step S6, the resultant value is stored together with the value of Pseudo_AU_Size. In step S7, the variables T and AUS are updated.

Since AUS has been substituted into Pseudo_AU_Size in step S4, AUS is reset to zero in step S7. As a result, step S8 concludes that AUS is equal to zero, and thus the process is completed.

If the time Pseudo_PTS when the supplying of data to the first-stage buffer 21 is completed and the size Pseudo_AU_Size of each pseudo access unit are regarded as the decoding time and the size of an access unit at the first-stage buffer 21, then the standard decoder with the two-stage buffer can be replaced by the standard decoder with an one-stage buffer and the problem to be solved can be replaced by the problem of supplying an access unit with a size Pseudo_AU_Size by the time Pseudo_PTS. The above replacement allows the scheduling for a mixture of various types of data to be performed more easily.

Although in the first embodiment described above a mixture of various types of data is supplied to the standard decoder with two stages of buffers, the standard decoder may also be of the type with three or more stages of buffers.

Now a second embodiment of a digital signal encoder according to the present invention will be described below. In this second embodiment, it is assumed that the data be encoded in the form which can be correctly decoded by a standard decoder with an one-stage buffer such as that shown in FIG. 10. Thus, the digital signal encoder of this embodiment is adapted to convert an elementary stream such as a linear PCM audio stream into a MPEG system stream in the form of packets which can be decoded by the above standard decoder. In the case of the linear PCM audio stream, the size of each access unit is rather small and thus the time interval between the decoding times is short. Therefore, in the generation of a MPEG system stream, it is possible to combine a predetermined number of access units into a single packet. The structure of an encoder employed in this second embodiment is generally the same as that employed in the first embodiment described above with reference to FIG. 5, and therefore FIG. 5 will also be referred to. However, elements themselves constituting the encoder are different from those of the first embodiment, different reference numerals will be used to denote them.

In the second embodiment of the digital signal encoder, an audio elementary stream applied to the encoder is supplied to an access unit detector 51 and a packetizer 53. The access unit detector 51 extracts an access unit from the given audio elementary stream, and detects the size of the access unit and the decoding time information. In this case, the obtained access unit corresponds to an audio frame. The access unit detector 51 supplies the detected information about the size of the access unit to a pseudo access unit calculator 52, and supplies the detected information about the time of decoding to both the pseudo access unit calculator 52 and a packetizer 53.

The pseudo access unit calculator 52 generates a pseudo access unit by combining a plurality of access units into a single pseudo access unit. The pseudo access unit calculator 52 then calculates the size of the pseudo access unit and also the time (pseudo decoding time) when the pseudo access unit will be input to a buffer 61 shown in FIG. 10. The resultant values are supplied to a scheduler 54.

According to the pseudo access unit size and the pseudo decoding time, the scheduler 54 determines the time (clock reference) when the multiplexed stream will be supplied to the decoder and also determines the packet size. The resultant values are supplied to the packetizer 53. The packetizer 53 converts the elementary stream into packets. The packetizer 53 also encodes the decoding time data supplied from the access unit detector 51 as well as the clock reference data supplied from the scheduler 54. These data are combined into a MPEG system stream (a transport stream or a program stream) having a structure such as that shown in FIG. 1.

Figure 10:
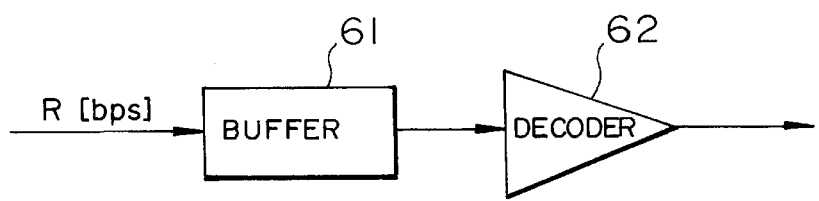
FIG. 10 is a block diagram illustrating an example of the construction of a standard decoder with an one-stage buffer.

In the case where the stream output from the packetizer 53 is a transport stream, the stream is transmitted via a proper transmission line 55 to a decoder such as that shown in FIG. 10. On the other hand, if the stream output from the packetizer 53 is a program stream, it is recorded on a proper recording medium 56. The stream recorded on the recording medium can be reproduced therefrom and applied to the decoder shown in FIG. 10.

Referring to FIG. 10 illustrating the standard decoder with an one-stage buffer, the data is supplied to a buffer 61 at a rate R [bps]. The buffer 61 detects the decoding time associated with the data, and outputs that data at the detected decoding time to a decoder 62 at a rate r [bps]. In this case, since the time interval between decoding times is sufficiently short, the buffer 61 can be considered to continuously generate data.

The decoder 62 decodes the data supplied from the buffer 61, and outputs the decoded data to a specified device such as a display device.

Figure 11:
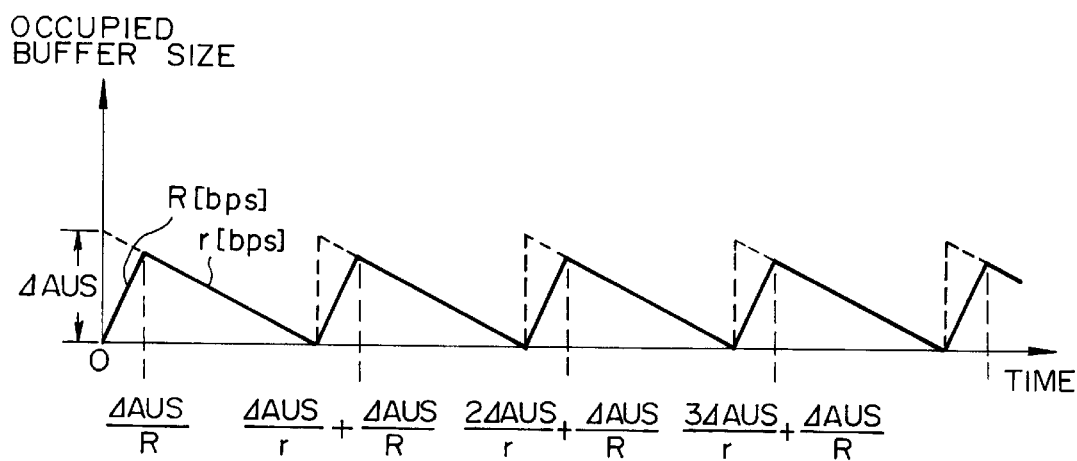
FIG. 11 illustrates an example of the change in size of data occupying the buffer shown in FIG. 10.

The size of data occupying the buffer 61 will be described below. The buffer 61 starts receiving data at time 0 which is supplied at the rate R [bps]. In the case where decoding operation starts immediately after the buffer 61 has started receiving the data, the buffer 61 starts transferring the received data to a decoder 62 at a rate r [bps]. Therefore, the buffer 61 accumulates the data at a rate equal to R−r [bps] as long as the data is supplied to the buffer 61 at a rate R [bps]. Thus the size of data occupying the buffer 61 changes with time in the same manner as that of the first-stage buffer 21 as described above with reference to FIG. 7A. Therefore, the size of data occupying the buffer 61 changes periodically with time with a period equal to $\Delta AUS/r$ as shown in FIG. 11.

Now the operation of the pseudo access unit calculator 52 in the encoder will be described below. The pseudo access unit calculator 52 in the encoder determines the size of the pseudo access unit supplied to the buffer 61 as well as the time at which the supplying of all the pseudo access unit will be completed so that a predetermined size of data can be supplied to the buffer 61 of the standard decoder by the decoding time PTS thereby ensuring that the decoder can decode the data correctly.

If the size of the pseudo access unit is given as $\Delta AUS$, the maximum data size occupying the buffer 61 is given by $\Delta AUS(1-r/R)$ as in the first embodiment. Therefore, $\Delta AUS$ must meet $\Delta AUS(1-r/R)<$(the size of the buffer 61) so as to avoid the overflowing in the buffer 61.

Thus, the pseudo access unit calculator 52 combines access units into a pseudo access unit so that the size of the pseudo access unit does not exceed $\Delta AUS$. Furthermore, the pseudo access unit calculator 52 outputs a pseudo decoding time which indicates when the pseudo access unit should be decoded, that is, the time by which the inputting of the pseudo access unit to the buffer 61 should be completed.

Figure 12:
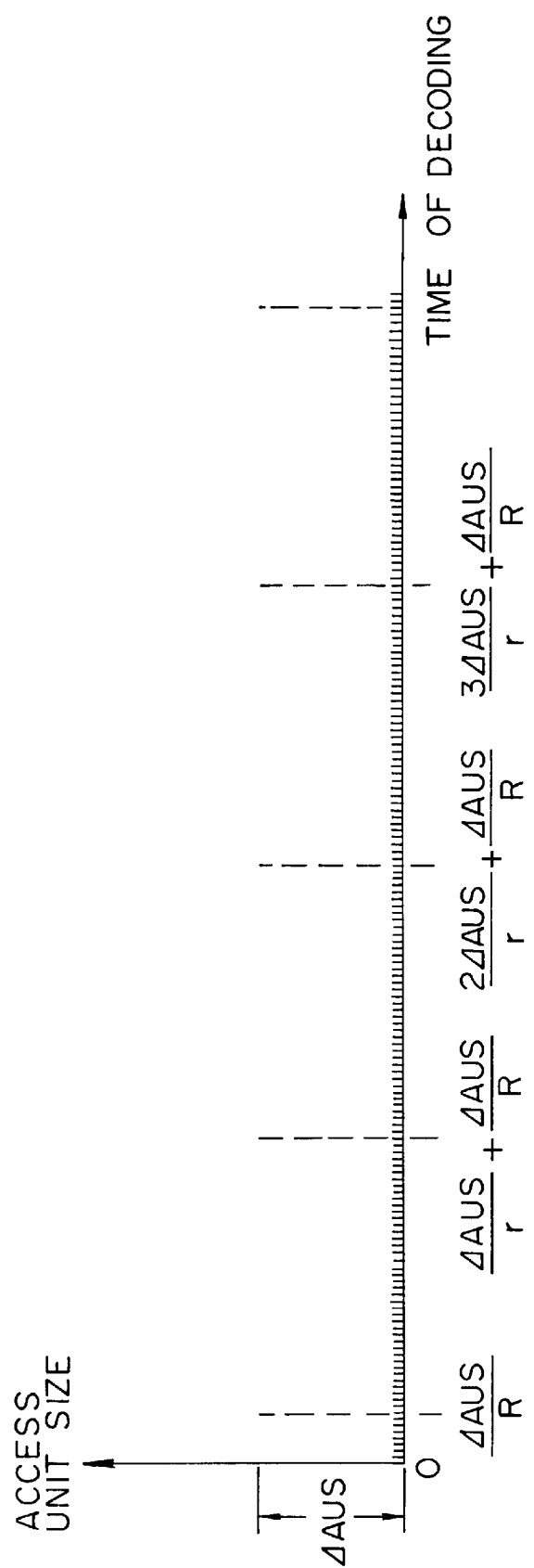
FIG. 12 illustrates the sizes of access units generated according to a second embodiment of the invention, as a function of time.

Thus, as shown in FIGS. 11 and 12, the pseudo decoding times (the times when the inputting of data to the buffer 61 is completed) are given by $\Delta AUS/R$, $\Delta AUS/r+\Delta AUS/R$, $2\Delta AUS/r+\Delta AUS/R$, and so on.

In this embodiment, since a plurality of access units each having a small size are combined into a single pseudo access unit as described above, a great number of access units are converted into packets at extremely longer time intervals (denoted by broken lines in FIG. 12) than in the case where access units are directly converted into packets (denoted by solid lines in FIG. 12). This allows a great reduction in the number of operations of converting the access units into packets, which results in an improvement in the operation efficiency.

It should be noted here that this second embodiment may also be employed to handle data other than linear PCM audio data.

In the method and apparatus for encoding a digital signal according to the present invention, as described above, a bit stream of digital signal is encoded in such a manner that each access unit is divided into pseudo access units each having a predetermined size; the time when the inputting of each pseudo access unit to the buffer should be completed is calculated; and the data is encoded so that the respective divided pseudo access units can be successfully applied by the times calculated above. During the encoding process, the scheduling is required only for the access units applied to the first-stage buffer and it is no longer required to monitor the buffers over all the stages. This makes it easier to encode the data.

In the digital signal transmission method and apparatus according to the present invention, as described above, a bit stream of digital signal is encoded in such a manner that: a large number of access units each having a small size are combined into a pseudo access unit; the time when the inputting of each pseudo access unit to the buffer should be completed is calculated; and the data is encoded so that the respective divided pseudo access units can be successfully applied by the times calculated above. This allows a great reduction in the number of operations of converting the access units into packets, which results in an improvement in the operation efficiency.

In the digital signal transmission method and apparatus according to the present invention, as described above, a bit stream of digital signal is transmitted in such a manner that: each access unit is divided into pseudo access units each having a predetermined size; the time when the inputting of each pseudo access unit to the buffer should be completed is calculated; and the data is encoded so that the respective divided pseudo access units can be successfully applied by the times calculated above.

Furthermore, in the digital signal transmission method and apparatus according to the present invention, when a digital signal in the form of a bit stream is transmitted, a plurality of access units each having a small size are combined into a single pseudo access unit, and the time when the pseudo access unit should be applied to the buffer is then calculated. In this technique, the above time is regarded as the pseudo decoding time for the pseudo access unit. This allows a great reduction in complexity of the algorithm of combining the access units.

Although in the specific examples described above the invention is embodied with hardware represented by the block diagrams, the invention may also be embodied with software in conjunction with a CPU and a memory.

Although the invention has been described above with reference to the specific embodiments, the invention is not limited to these embodiments and various modifications and applications may also be possible without departing from the spirit and scope of the present invention as defined in the claims appended hereto.

What is claimed is:

1. A method of encoding a digital signal in the form of a stream, which will be decoded later via at least first and second stage buffers, said method comprising the steps of:

dividing each access unit defined for each bit stream into a plurality of pseudo access units each having a same predetermined size which is smaller than that of said access unit, in which the size of each pseudo access unit is based on the size of said first stage buffer, a data transfer rate to said first stage buffer and a data transfer rate to said second stage buffer;

calculating a time when the inputting of each said pseudo access unit to a respective buffer is completed in response to a time stamp of said access unit and a data transfer rate of said buffer; and converting each of said plurality of pseudo access units into a packet so that said pseudo access units will be input to said buffer by the time determined by said calculation.

2. An apparatus for encoding a digital signal in the form of a stream, which will be decoded later via at least first and second stage buffers, said apparatus comprising:

means for dividing each access unit defined for each bit stream into a plurality of pseudo access units each having a same predetermined size which is smaller than that of said access unit, in which the size of each pseudo access unit is based on the size of said first stage buffer, a data transfer rate to said first stage buffer and a data transfer rate to said second stage buffer;

means for calculating a time when the inputting of each said pseudo access unit to a respective buffer is completed in response to a time stamp of said access unit and a data transfer rate of said buffer; and means for converting each of said plurality of pseudo access units into a packet so that said pseudo access units will be input to said buffer by the time determined by said means for calculating.

3. A method of transmitting a digital signal in the form of a stream, which will be decoded later via at least first and second stage buffers, said method comprising the steps of:

dividing each access unit defined for each bit stream into a plurality of pseudo access units each having a same predetermined size which is smaller than that of said access unit, in which the size of each pseudo access unit is based on the size of said first stage buffer, a data transfer rate to said first stage buffer and a data transfer rate to said second stage buffer;

calculating a time when the inputting of each said pseudo access unit to a respective buffer is completed in response to a time stamp of said access unit and a data transfer rate of said buffer;

generating a transmission stream by converting each of said plurality of pseudo access units into a packet so that said pseudo access units will be input to said buffer by the time determined by said calculation; and transmitting said transmission stream.

4. An apparatus for transmitting a digital signal in the form of a stream, which will be decoded later via at least first and second stage buffers, said apparatus comprising:

means for dividing each access unit defined for each bit stream into a plurality of pseudo access units each having a same predetermined size which is smaller than that of said access unit, in which the size of each pseudo access unit is based on the size of said first stage buffer, a data transfer rate to said first stage buffer and a data transfer rate to said second stage buffer;

means for calculating a time when the inputting of each said pseudo access unit to a respective buffer is completed in response to a time stamp of said access unit and a data transfer rate of said buffer; and means for generating a transmission stream by converting each of said plurality of pseudo access units into a packet and then transmitting said transmission stream so that said pseudo access units will be input to said buffer by the time determined by said means for calculating.

5. A recording medium for recording a signal which can be decoded by a decoding apparatus with at least first and second stage buffers, said signal recorded on said recording medium including a coded bit stream which can be decoded via said stage buffers, said coded bit stream being generated by the process including the steps of:

dividing an access unit defined for each said bit stream into a plurality of pseudo access units each having a same predetermined size which is smaller than that of said access unit, in which the size of each pseudo access unit is based on the size of said first stage buffer, a data transfer rate to said first stage buffer and a data transfer rate to said second stage buffer;

calculating a time when the inputting of each said pseudo access unit to a respective buffer is completed in response to a time stamp of said access unit and a data transfer rate of said buffer; and converting each of said plurality of pseudo access units into a packet and then outputting the resultant coded stream so that said pseudo access units will be input to said buffer by the time determined by said calculation.

6. A transmitting apparatus for transmitting an elementary stream encoded by an encoder to a decoder, wherein said decoder has a first stage buffer and a second stage buffer, said apparatus comprising:

detecting means for detecting an access unit of said elementary stream;

generating means for generating a plurality of pseudo access units by dividing said access unit, wherein said generating means calculates a pseudo access unit size based on the size of said first stage buffer, a data transfer rate to said first stage buffer and a data transfer rate to said second stage buffer, wherein said generating means further calculates pseudo time stamps corresponding to said plurality of pseudo access units based on said pseudo access unit size and a decoding time stamp of said access unit; and scheduling means for scheduling a transmission of said pseudo access units in response to said pseudo access unit size and pseudo time stamps so that said pseudo access units will be inputted to said first stage buffer in response to said pseudo time stamps, and so that said access unit will be extracted from said second stage buffer in response to said decoding time stamp.

* * * * *